Patented Mar. 12, 1935

1,993,750

UNITED STATES PATENT OFFICE 1,993,750

COMPOSITION OF MATTER AND PROCESS OF MAKING THE SAME

Harold Robert Rafton, Andover, Mass., assignor to Raffold Process Corporation, a corporation of Massachusetts No Drawing. Original application March 15, 1928, Serial No. 262,030. Divided and this application August 27, 1930, Serial No. 478,285

25 Claims. (Cl. 134—22)

One object of my invention is to produce a new, useful, and improved sized paper made with a carbonate filler, and to provide a simple method for accomplishing this result.

This is a division of my copending application Serial No. 262,030, filed March 15, 1928, now Patent No. 1,819,441, issued August 18, 1931.

Further objects are the employment of paraffin in manufacturing this paper; the use of this paraffin in emulsified form; the production of a complex between the emulsion and the carbonate filler; the avoidance of the difficulties heretofore existing when paraffin emulsions were employed in papermaking; the avoidance of the use of rosin; the production of a more age-resistant paper; the production of a paper which shows little discoloration with age; and other objects which will appear in the detailed description which follows.

When I use the expression "carbonate filler" (or fillers) I mean the substantially water insoluble carbonates (normal or basic) of the alkaline earth metals (which expression is herein intended to include magnesium), or compounds, or double salts, or physically associated mixtures of these with one or more other acid soluble materials of a substantially water insoluble nature, these fillers whether simple or complex as above, being characterized by the fact that, when agitated in contact with freshly boiled distilled water in concentrated suspension for say an hour, they impart to the water a pH value which is on the alkaline side of the neutral point, and also by the fact that they give off carbon dioxide gas when brought into contact with an aqueous mineral acid, e. g. hydrochloric acid. Examples of such fillers are calcium carbonate, of which lime mud from the causticizing process is one form; calcium carbonate magnesium basic carbonate employed in the paper disclosed in my U. S. Patent No. 1,595,416 of August 10, 1926; and calcium carbonate magnesium hydroxide, disclosed in my U. S. Patent No. 1,415,391 of May 9, 1922, and used in the filled paper disclosed in my U. S. Patent No. 1,598,104 of August 31, 1926. Of course these fillers are referred to not only in their chemically pure form, but also in commercial form containing such impurities as may occur in such commercial products; and also when present with other material, so that they constitute only a part either major or minor, of the whole, (one special case of which is described more fully in the following paragraph). It should be stated that any given filler of the type referred to is not necessarily of uniform particle size; nor are the average particle sizes of the fillers necessarily alike, as some of the fillers of the type referred to have relatively coarse grain particles, whereas others are much more finely divided, and some are so finely divided that they may be said to approach or be in the colloidal condition.

Moreover when I use the expression "carbonate filler" (or fillers) I mean to include not only the case where it is added as such to the beaters, or other similar or mixing or compounding or disintegrating or treating machine, but also the case where it may be added wholly or in part incorporated with fibrous material and/or other material. Such a case would be where paper made with carbonate filler, either as a filling or coating constituent, or both, is reused in the papermaking process. Such papers may be those known to the trade as "old papers" or "old waste papers" or "waste papers" in any form, or returned trimmings or damaged paper or the like, or they may be the "broke", that is, the partially made, the imperfect, or the waste paper which accompanies the papermaking, finishing, storing, packing, shipping, or the like operations in a paper mill, and which is reworked either in the same or some other mill. Such papers are sometimes reworked by themselves and added in broken down or in pulp form in the paper making process, being treated or cooked in some cases with or without chemicals and washed if desired,—this reworking meaning to include the process of deinking if such is practiced or of bleaching or of both deinking and bleaching,— or sometimes they are added directly to the other paper making ingredients in the beater or similar or other mixing or compounding or disintegrating or treating machine, and broken up directly therein. In any event they are a source of carbonate filler in the paper to be made, and are included in the term "carbonate filler" (or fillers) as used herein.

When I employ the term "paraffin" herein, I mean paraffin wax, which is solid at ordinary or room temperature. I do not mean to restrict myself only to the paraffin hydrocarbons, but mean to include in this term all the hydrocarbons of a waxy nature substantially unsaponifiable and inert to acidic and alkaline materials under ordinary conditions of temperature and pressure, whether derived from petroleum, shale, lignite, earth wax, or other natural or artificial sources. I do not, however, mean to include in this term material of a pitchy nature.

When I use the word "paper" herein, I use it in the broad sense to include products of manufacture of all types and of all weights and thicknesses, which contain as an essential constituent a considerable amount of prepared fibre and which are capable of being produced on a Fourdrinier, cylinder, or other forming, or felting, or shaping, or molding machine.

The novelty of the present invention does not reside broadly in the production of a sized carbonate filled paper as a new article of manufacture, as such papers have been previously known: e. g., see Losh's British Patent No. 2664 of 1859; Cappaza's British Patent No. 5776 of 1899; Statham's U. S. Patent No. 1,209,221 of December 19, 1916; and my U. S. Patents No. 1,595,416 of August 10, 1926, and No. 1,598,104 of August 31, 1926.

In some of the examples cited rosin is employed as the sizing agent. My invention, however, does not involve the use of rosin size, but on the other hand makes use, in a manner which is set forth fully below, of paraffin, preferably in a comminuted form commonly called an "emulsion", (i. e., a suspension of minute discrete particles of paraffin in a liquid, preferably aqueous or miscible with water), containing an "emulsifying agent", (i. e., a material or materials which tend to prevent the coalescence of the discrete particles of paraffin). Such emulsions are well known and may be satisfactorily produced in a variety of ways, as e. g., in a dispersion machine, such as in one of a variety of colloid mills or homogenizers. An example of such an emulsion is paraffin emulsified in water with a sulphonated oil as emulsifying agent; another example is paraffin emulsified in water with ammonium oleate as emulsifying agent. Others will occur to those skilled in the art. In regard to the paraffin used, of course, either low or high melting point material can be employed. The so-called fully refined paraffin is entirely satisfactory because it does not impart objectionable color to white sheets. However, for purposes of economy, it is often desirable to use a less pure material and for instance such material as is known to the trade as a semi-refined paraffin scale, containing approximately 1-2% of oil and water as impurities, gives satisfactory results. Such material will perhaps in certain cases have varying melting points, but one particular sample used, for example, had a melting point of approximately 115° F. (46° C.). Other even more impure paraffins may be used, especially if the color (whiteness) requirements of the finished paper are not too exacting, or if papers, other than white, are to be made.

The use of emulsions of paraffin in paper is known but this use has been directed mainly to the production of paraffined rather than to sized (i. e., resistant in varying degree to ordinary aqueous writing ink) paper, or at least to paper containing a relatively higher percentage of paraffin than that required for sizing in my process. Such papers may have a paraffin finish or be translucent or even transparent, and waterproof, but my paper does not partake of these characteristics, but is similar to, and by mere observation cannot be readily distinguished from, ordinary rosin sized filled papers.

However, to my knowledge, heretofore it has not been proposed to use paraffin emulsions as sizing agents with carbonate fillers, nor has the specific effect been noted when such employment is made, nor the unique use that can be made of such effect.

In some of the papers referred to above in which paraffin emulsions have been previously used, the paraffin is precipitated on the fibre while the fibre is in aqueous pulp condition, usually by alum, in discrete form so that the individual particles of paraffin are deposited from the emulsion on the fibre and coalesced by fusion on the driers of the paper machine. Paraffin is normally non-adhesive, in contradistinction to certain pitchy materials which are normally adhesive materials. When precipitated in minute discrete particles on the fibre, there is a tendency, however, for some of these particles under the conditions of agitation obtaining in the papermaking process to become detached from the fibre, and such particles may be agglomerated by pressure or otherwise so that relatively coarse flakes or lumps of paraffin are formed and exist at the wet end of the paper machine. These may cause very serious trouble particularly with the screens and the wet end of the paper machine itself particularly with various parts of the machine clothing, and the press rolls. In other cases where paraffin is used in emulsion form, the paraffin is adsorbed or absorbed on the fibre from an emulsion under very special conditions as to hydration,—and in one case, under specific conditions as to acidity,—which do not obtain in ordinary paper making operations. The use of my method, however, avoids the difficulties, and the necessity for use of special conditions, above mentioned.

I have discovered that a paraffin emulsion and an aqueous suspension of carbonate filler mutually flocculate one another and that this "flocculate" or "complex" of paraffin and carbonate filler does not partake of the nature of discrete particles of paraffin, is not broken down to discrete paraffin particles by mechanical action, and has no tendency to ball up and agglomerate as do unattached discrete particles of paraffin released from the emulsifed condition, and is not of such a nature as to adhere to the paper machine or machine clothing.

I have not sufficient evidence yet to be certain of the exact nature of the action taking place or of the product thereof and I therefore have named this combination or association of carbonate filler and paraffin, whether physical or chemical or both, a "complex."

When such a complex, prepared by flocculation in dilute suspension from quantities of carbonate filler and paraffin emulsion proportionate for instance to those used in making a filled sized paper containing say 20% or more carbonate filler, e. g., 25 parts of calcium carbonate magnesium hydroxide and 3 parts paraffin in emulsified form, and the flocculated mass is separated from the supernatant liquid and then dried say at 100–110° C., there is no evidence of melted paraffin, but on the contrary the flocculent complex dries out to a powdery mass, non-sticky and non-agglomerant whether hot or cold, and this complex may be seen by floating it on aqueous ink to possess ink resistant qualities. When the dried complex is gently heated in a crucible over a flame a vapor is driven off which has an odor similar to that of volatilized paraffin, and this vapor catches fire if a flame is juxtaposed. Moreover if another portion of this same complex before drying is subjected for say several minutes in a beaker in presence of water to a vigorous boiling, and the beaker cooled, no scum of paraffin is found to have separated to the surface, and no evidence of any separation of paraffin is noted. I have also found that if a definite quantity of a given emulsion be diluted, and successive quantities of a suspension of carbonate filler be added with agitation until all the emulsion has been flocculated, that there seems to exist a stoichiometrical relation between the amount of paraffin present and the amount of filler required to precipitate it, which is different for different carbonate fillers; e. g., with one emulsion it required approximately 2.4 parts of a certain sample of calcium carbonate magnesium hydroxide to flocculate substantially completely 1 part of paraffin in emulsified form, whereas with a certain sample of lime mud only .6 part was required per 1 part of paraffin. This is not advanced as an argument in favor of the chemical nature of the complex, as it is realized that certain physical conditions might also bring about a similar result.

Furthermore it should be stated that this flocculation does not appear to be the result of the action of the carbonate filler with the emulsifying agent, as for example, although an ammonium oleate stabilized emulsion and calcium carbonate magnesium hydroxide mutually flocculate one another, I have found that this carbonate filler has no noticeable flocculating effect on this stabilizer in the absence of the emulsified paraffin.

All the above is offered as evidence of the peculiarly stable nature of this novel carbonate filler-paraffin complex which renders it particularly useful and satisfactory under the conditions under which it is employed.

As an example of the method of practicing my invention I may place the fibrous pulp in the beater, or other similar or compounding or mixing or distintegrating or treating machine, then add the paraffin emulsion,—a convenient way being in dilute form,—incorporate this thoroughly with the pulp, then add the carbonate filler, then starch if desired and/or alum (attention in this connection being directed to my copending application Serial No. 202,453, filed June 29, 1927, now matured into Patent No. 1,831,928, issued November 17, 1931). The above order of addition is not essential, but a convenient and desirable one for several reasons: 1. It allows thorough incorporation of emulsion with the fibre before the formation of the carbonate filler-paraffin complex; 2. If the emulsion be one which is "cracked" or broken by alum, this action will be prevented by the prior formation of the carbonate filler-paraffin complex. Such "cracking" by alum would produce free—i. e., unemulsified-paraffin in a form tending to agglomerate into specks or lumps, which would cause trouble on the paper machine.

In the case where broke and/or old papers, containing carbonate filler (as discussed in detail above) is used as part of the furnish, it is advisable to add this part after the paraffin emulsion has been thoroughly incorporated with the other fibrous ingredients.

It is advisable to use as stable an emulsion as feasible, this being particularly recommended in cases where hard water is to be used and/or where the fibrous constituents have not been washed sufficiently to remove such soluble materials which have a tendency to crack the emulsion and thus precipitate free paraffin, before the carbonate filler-paraffin complex can be formed. In such cases it does not suffice to add the carbonate filler to the fibre prior to the emulsion, as there is bound to be at least a partial cracking of the emulsion by the hard water or soluble materials from the fibre with a corresponding production of undesirable free paraffin. Sometimes in such cases an otherwise less stable emulsion can be "protected", as with an alkali, for example ammonia.

It is also desirable in adding the paraffin emulsion to adopt the usual practice in adding liquids in the paper making procedure, namely to pass it through a fine mesh screen before admixture with the other ingredients.

The reaction of the furnish for making my paper will normally be on the alkaline side of the neutral point, that is, will have a pH value higher than 7.

An illustrative furnish which advantageously may be used in practicing my invention, to produce for instance a filled sized book or magazine paper which will give an "ink test", (i. e., the time required for an ordinary aqueous writing ink at room temperature to strike through a sample of paper when floated thereon) of from one up to several minutes or more, according to circumstances, is as follows:

| | Pounds |
|---|---|
| Fibrous furnish (sulphite and soda) | 1500 |
| Emulsified paraffin, calculated as lbs. paraffin present (3% on total weight of fibre and filler) | 60 |
| Calcium carbonate magnesium hydroxide | 500 |
| Starch | 50 |
| Alum | 75 |

Of course lesser amounts of paraffin emulsion may be used with lesser sizing effect. The figures (lbs.) given above refer to air dry weights in all cases except the filler (calcium carbonate magnesium hydroxide), in which case the figure given refers to bone dry weight.

This furnish may be added to the beater in the ordinary way, and then subjected to the usual paper making procedure on a Fourdrinier, cylinder, or other forming, or felting, or shaping, or molding machine, and the paper finished in the usual manner, using the regular machines normally employed for the various processes or of course special machines may be employed if desired. The resultant paper may be used for such purposes as those to which sized filled papers are normally put, including that as a raw stock for further conversion, as for example for coating. The carbonate filler in my paper, as is the filler in other filled papers, is distributed substantally uniformly throughout.

My paper has the distinct advantage of possessing age resisting qualities in a unique degree. It is well known that acid conditions in papers are very detrimental to permanence: such conditions are rendered impossible by the use of a carbonate filler. It is also well known that rosin sized papers discolor with age, and some authorities are of the opinion that the rosin acts catalytically in the oxidation and subsequent deterioration of the cellulosic content of the paper: the absence of rosin in my sized paper removes this undesirable discoloring and oxidizing agent, and the presence of paraffin substitutes in its stead a material noted for its extreme inertness, permanence, and resistance to oxidation. Thus by the combination of a carbonate filler and paraffin in paper, I have avoided in a unique manner the principal deteriorating effects which now tend to make paper less permanent, and have incorporated in the paper materials which mutually lend their assistance in rendering the paper more permanent and more age resisting.

Such a permanent paper has of course a great advantage for purposes which require preservation of the paper. It also has a decided economic advantage, as certain papers, which in order to obtain permanency have heretofore been required to be made with all or a portion of the fibrous furnish consisting of particularly resistant cellulose as rag fiber, may now, because of the enhanced permanency arising from the carbonate filler—paraffin content, and the absence of rosin, be made with a lesser amount of resistant cellulose fibre, or in some cases, in the absence of such resistant fibre. This will result in economy in the manufacture of such papers, as the resistant celluloses are more expensive than the ordinary fibres substituted therefor.

By the term "rosin" as hereinafter employed I intend to include not only rosin but any compound thereof.

Whereas I have described several illustrative formulae, furnishes, procedures, and methods of operation, I do not intend to be limited thereby, as my invention may be practiced in a wide variety of ways, with wide variations of formulae, under a wide variety of conditions, and with a broad variety of raw materials, and various changes may be resorted to in the practice of my invention without departing from the spirit of my invention or the scope of the subjoined claims. Likewise I do not intend to be limited by any theory expressed herein as the scope of my invention is independent thereof.

In the claims, where I use the word "compound", I mean one or more compounds of the kind indicated.

As pointed out above in defining "carbonate filler", it is to be understood that this term is not intended to include substantially water-soluble materials.

By polyvalent metal I mean metal having a valence of more than one.

I claim:

1. A composition of matter comprising the flocculation product of the interaction of carbonate filler and paraffin emulsion.

2. A composition of matter comprising the flocculation product of the interaction of carbonate filler and paraffin emulsion in the absence of rosin.

3. A composition of matter comprising the flocculation product of the interaction of alkaline earth metal carbonate and paraffin emulsion.

4. A composition of matter comprising the flocculation product of the interaction of calcium carbonate and paraffin emulsion.

5. A composition of matter comprising the flocculation product of the interaction of calcium carbonate magnesium basic carbonate and paraffin emulsion.

6. A composition of matter comprising the flocculation product of the interaction of calcium carbonate magnesium hydroxide and paraffin emulsion.

7. A composition of matter in which carbonate filler is present in substantial amount comprising the flocculation product of the interaction of carbonate filler, paraffin emulsion, and substantially water soluble aluminum compound.

8. A composition of matter in which carbonate filler is present in substantial amount comprising the flocculation product of the interaction of alkaline earth metal carbonate, paraffin emulsion, and substantially water soluble aluminum compound.

9. A composition of matter in which carbonate filler is present in substantial amount comprising the flocculation product of the interaction of calcium carbonate, paraffin emulsion, and substantially water soluble aluminum compound.

10. A composition of matter in which carbonate filler is present in substantial amount comprising the flocculation product of the interaction of calcium carbonate magnesium basic carbonate, paraffin emulsion, and substantially water soluble aluminum compound.

11. A composition of matter in which carbonate filler is present in substantial amount comprising the flocculation product of the interaction of calcium carbonate magnesium hydroxide, paraffin emulsion, and substantially water soluble aluminum compound.

12. A composition of matter in finely divided condition comprising carbonate filler the particles of which have a coating thereon comprising paraffin, and substantially water insoluble aluminum soap.

13. The process of producing a composition of matter comprising mixing carbonate filler with paraffin emulsion.

14. The process of producing a composition of matter in which carbonate filler is present in substantial amount comprising mixing carbonate filler with paraffin emulsion, and adding substantially water soluble compound of aluminum.

15. The process of producing a composition of matter in which carbonate filler is present in substantial amount comprising mixing carbonate filler with paraffin emulsion, and adding alum.

16. A composition of matter in finely divided condition comprising carbonate filler the particles of which have a coating comprising paraffin thereon and which is substantially miscible with water when produced, but substantially water repellent after it has been dried.

17. A filling composition in finely divided condition comprising carbonate filler the particles of which have a coating comprising paraffin thereon.

18. The process of producing a composition of matter in which carbonate filler is present in substantial amount comprising mixing carbonate filler with paraffin emulsion, and adding substantially water soluble salt of a polyvalent metal.

19. A method of rendering finely divided calcium carbonate substantially less reactive with acidic material, which comprises treating such carbonate with an aqueous emulsion of paraffin.

20. A method of making a product of manufacture which comprises providing in an aqueous medium materials comprising carbonate filler and substantially water insoluble sizing agent substantially unreactive in respect to said filler, the weight of said filler present being substantially greater than the weight of said agent present, and drying said mix.

21. A product of manufacture in substantially dry condition having the characteristics of having been derived from an aqueous mix comprising carbonate filler and a substantially water insoluble substantially water repellant agent substantially unreactive in respect to said filler, the weight of said filler present being substantially greater than the weight of said agent present.

22. A method of making a product of manufacture which comprises providing in an aqueous medium materials comprising carbonate filler, substantially water insoluble sizing agent substantially unreactive to said filler, the weight of said filler present being substantially greater than the weight of said agent present, and substantially water soluble salt of a polyvalent metal, and drying said mix.

23. A product of manufacture in substantially dry condition having the characteristics of having been derived from an aqueous mix comprising carbonate filler, substantially water insoluble substantially water repellent agent substantially unreactive in respect to said filler, the weight of said filler present being substantially greater than the weight of said agent present, and substantially water soluble salt of a polyvalent metal.

24. A new filling material comprising a carbonate filler composition in finely divided condition possessing reactivity with acidic material in substantially reduced degree in comparison with the carbonate filler content of said composition, said carbonate filler content comprising substantially the greater part by weight of said carbonate filler composition.

25. As a new composition: an aqueous mix which comprises acidic material and a filling material comprising a carbonate filler composition in finely divided condition possessing reactivity with said acidic material in substantially reduced degree in comparison with the carbonate filler content of said composition, said carbonate filler content comprising substantially the greater part by weight of said carbonate filler composition, and said acidic material being present in an amount substantially less than the chemical equivalent of the carbonate filler content of said composition.

HAROLD ROBERT RAFTON.